July 3, 1962  C. H. SMITH  3,042,385
CABLE LAYING SYSTEM
Filed Oct. 29, 1959  6 Sheets-Sheet 1

INVENTOR
Charles H. Smith
BY Watson, Cole, Grindle & Watson
ATTORNEYS

July 3, 1962 C. H. SMITH 3,042,385
CABLE LAYING SYSTEM
Filed Oct. 29, 1959 6 Sheets-Sheet 3

INVENTOR
Charles H. Smith

BY Watson, Cole, Grindle & Watson
ATTORNEYS

July 3, 1962          C. H. SMITH          3,042,385
                    CABLE LAYING SYSTEM
Filed Oct. 29, 1959                    6 Sheets-Sheet 4

INVENTOR
Charles H. Smith

BY Watson, Cole, Grindle & Watson

ATTORNEYS

July 3, 1962 C. H. SMITH 3,042,385
CABLE LAYING SYSTEM
Filed Oct. 29, 1959 6 Sheets-Sheet 5

INVENTOR
Charles H. Smith
BY Watson, Cole, Grindle & Watson
ATTORNEYS

United States Patent Office 3,042,385
Patented July 3, 1962

3,042,385
CABLE LAYING SYSTEM
Charles H. Smith, Annapolis, Md., assignor to Flight Refueling Incorporated, Baltimore, Md., a corporation of Delaware
Filed Oct. 29, 1959, Ser. No. 849,481
30 Claims. (Cl. 258—1.2)

This invention relates to apparatus and processes concerned with the laying or dispensing of continuous line material, such as wire or cable from a supply of such material carried by a moving vehicle. More particularly, the invention has to do with the laying of communications wire over varying terrain from aircraft.

The general object of the invention is to provide novel and improved means and methods for accomplishing safely and efficiently the above stated general functions, these novel expedients involving both the preparation of the supply of line for easy and safe dispensing, and the actual paying-out of the line and the controlling of the procedure.

The stringing of combat communication wire by the military services, from moving vehicles, has been a matter of practical consideration for a number of years, and success has attended these efforts in this direction where the work has been done from ground vehicles moving at moderate speed. In such cases, the supply of strand or line material has been carried upon a rotary reel and payed-out therefrom at a rate proportional to the speed of the vehicle. The need for laying communications wire or cable across country, to which access from the ground is difficult or impossible, has led to experiments with laying the wire or conduit from aircraft. The use of aircraft for this purpose, if found to be feasible, has a further obvious advantage in greatly increased speed of operation.

Prior efforts in this direction have involved the paying-out of very short lengths of cable from a reel in the aircraft while the latter is moving at very low flight speeds. However, when the required speed of laying the cable and the length of the line to be laid increase beyond a certain point, it becomes impossible to use the conventional reel because of its weight and size, its out-of-balance characteristics, and its high rotational speed and resulting gyroscopic effect. It is also necessary to insure that the cable cannot become kinked or tangled when it is being laid at high speeds.

There is also another problem, when attempting to use a reel for dispensing the cable—the reel has a high inertia factor and variations in flight speed while laying the cable, or variations in the topography of the ground over which cable is being laid, require varying the velocity of feed or exit of the cable from stowage. It will be apparent from this, therefore, that the mass of any moving part involved in laying the cable must be kept to a minimum, and preferably it should be zero.

With the above in mind, the present invention contemplates the provision of a stowage in which there is no moving mass and in the handling of which it is physically impossible for conditions to arise which would cause a tangle in the cable, such as might result from a twist or torsional deformation imposed upon the strands by the continuous helical coiling of the cable upon a reel.

In the practice of the invention, it is preferred that whenever possible, helicopters be employed as the air vehicles, since ordinarily, desirable maximum speeds may be obtained by such a craft while at the same time affording the possibility of a wider variation in forward speeds, permitting substantially vertical take-offs and landings, and hovering en route if that be found necessary or desirable. Also, with the use of helicopters the packages of cable may be readily suspended from the belly of the craft.

Also, the invention provides means whereby longer lengths of cable than can be carried by a single aircraft, may be laid in a continuous operation. Ordinarily, if one aircraft can carry only say ten miles of cable, it would be necessary to place a marker at the end of the cable remote from the starting point, and then start laying the next length with sufficient overlap to enable a man—presumably landed at the point by helicopter or otherwise—to couple the two lengths of cable. There are obvious advantages if this procedure can be avoided, and the present invention provides means for laying a continuous cable of very much greater length than that which is equivalent to the capacity of one aircraft. The means by which the stowed packages of cable of several craft, initially flying in formation, may be interconnected is an important feature of the present invention.

Among other features of novelty may be mentioned the means for packing the cable or similar line material in convolutions for adequate stowage and for quick and safe detachment and out-feed. Such accommodations also take into consideration the need for providing, at predetermined intervals along the line, coupling elements and electrical appliances such as small repeaters or amplifiers for maintaining signal strength. It may also be mentioned at this point that the cable, when such is the line material being handled, may be arranged for maintaining communicaiton or the transmission of test signals throughout the laying procedure.

Within the purview of the invention are also embraced the provision of a novel suspended package for the wire or other line material, including a fairing for facilitating line feed and increasing the yaw stability of the package. Air foils of suitable construction may also be employed for this latter purpose. Means are also provided for quickly severing the line at the point where it issues from the package at any time, and also for jettisoning the entire package when necessary.

Other objects and features of novelty will be apparent from the following specification when read in connection with the accompanying drawings in which certain embodiments of the invention are illustrated by way of example.

Figure 1:
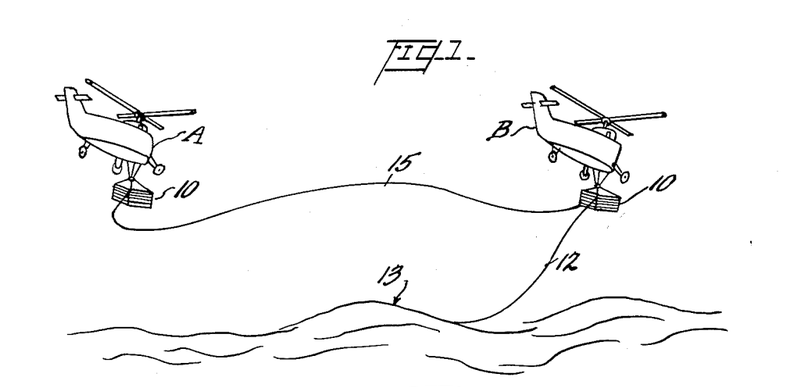
FIGURE 1 is a panoramic view in somewhat diagrammatic style showing one method of carrying out the general purpose of the invention.

In FIGURE 1 of the drawings, there are shown two helicopters A and B from the underside of each of which is suspended a wire package designated generally by the reference numeral 10. The wire or cable 12 is being payed out from the package carried by helicopter B across rugged terrain indicated generally by the reference numeral 13. The supply of wire in the package supported by helicopter B is connected to the supply carried by helicopter A by the length of wire or cable 15 so that when the first supply is depleted, the helicopter designated B may fly off and leave the remainder of the job of laying the wire to the helicopter A. The means whereby the various lengths of wire may be connected will be described in conjunction with the detailed description of the package 10. Obviously, more than two helicopters may be employed in this method of laying the cable, the amount of wire thus carried and laid being limited only by practical considerations of the number of aircraft available for the purpose and the ease of maneuvering.

Figures 2, 2A:
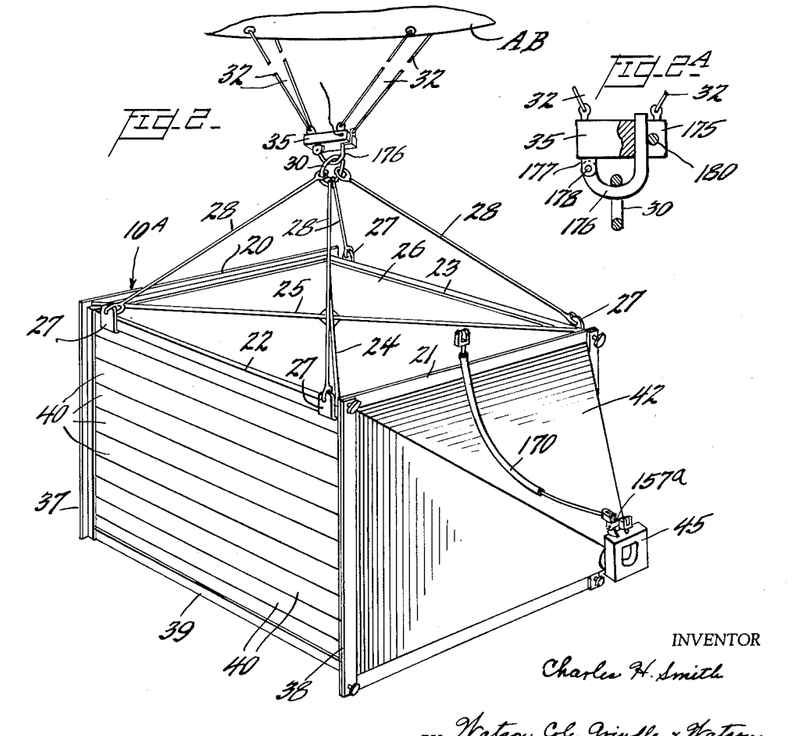
FIGURE 2 is a view in perspective of a wire package suspended from an aircraft and embodying the principles of the invention.
FIGURE 2A is an elevational view of a suggestive quick-detachable connection whereby the package may be jettisoned in an emergency.

In FIGURES 2, 2A, 3, 4 and 5, there are illustrated two embodiments of wire carrying packages, the one shown in FIGURES 3–5A bearing the previously applied general designation 10, and the one shown in FIGURE 2 being denoted by the reference numeral 10A, the chief difference in the two embodiments being the construction and arrangement of certain fairings and in the provisions for initiating the wire out-feed and means for severing the wire in cases of emergency.

Figure 3:
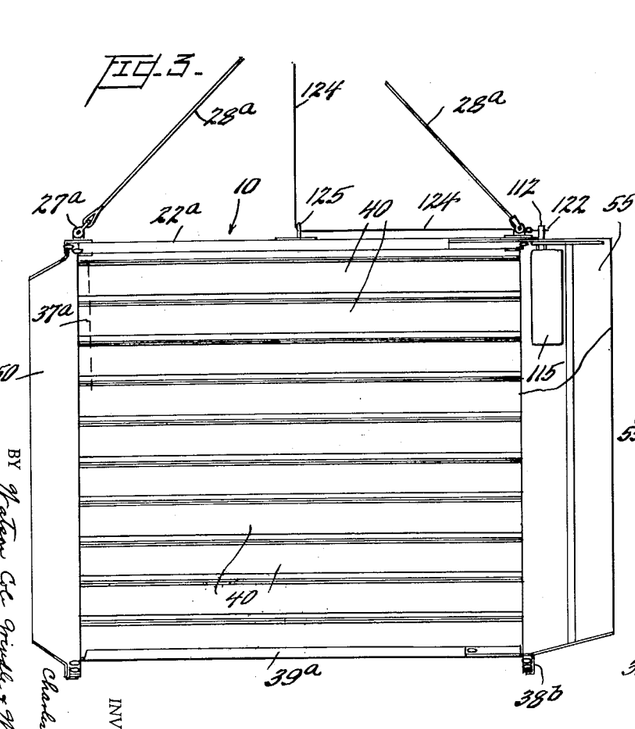
FIGURE 3 is a view in side elevation of a modified package.

The framework of the packages is preferably collapsible or dismantleable, and in both embodiments a top frame is provided which comprises a rear strut 20, a forward strut 21, and two side frame bars 22 and 23, this framing being cross-braced by diagonals 24 and 25, provided, if desired, with a top cover sheet 26. Ears 27 project upwardly from the corners of the frame and short lengths of supporting cable 28 converge toward the common suspension ring 30.

Extending in similar convergent arrangement from the lower side of the helicopter A, B are four rods or cables 32 which support a block 35 which is provided with quick-detachable connections for the suspension ring 30 which will be described presently.

Extending downwardly from the forward and rear supporting frame pieces 20 and 21 are rectangular frames 37 and 38, these frames being joined upon either side of the lower portions thereof by the fore-and-aft framing pieces 39, all being secured together by hand screws or bolts for ready dis-assembling.

This frame construction thus provides a cage of the general shape of a rectangular parallelepiped and within this framework are disposed a number of wire carrying units 40, each of these units comprising preferably a sheet metal box or tray in which multiple layers of wire convolutions are disposed in accordance with the process provided by the present invention.

In the particular embodiment illustrated in FIGURE 2 of the drawings the rear end of the package 10A is provided with a streamlined pyramidal fairing 42 which is furnished at its apex with an orifice member 45 which serves the purpose of a fairlead and a guillotine for severing the wire upon occasion. This device 45 will be described in detail after the presentation of the nature of the wire carrying units 40.

Proceeding now to the consideration of the embodiment of the package 10 shown in FIGURES 3, 4 and 5 of the drawings, it will be seen that a top frame is utilized which is quite similar to the one described in connection with FIGURE 2 and which consists of a top sheet member 26a provided with side frame elements 22a and 23a, a rear cross element 20a, and a forward cross element 21a. The diagonals 24a and 25a serve to brace the framing and a plate 29a is fixed to the intersection of these diagonal bracing members. A sling comprising the cable lengths 28a connects the eyes 27a at the corners of the framing with the suspension ring 30 as in the other embodiment.

Similar depending framing members are provided at the fore-and-aft ends of the package, the forward frame member being designated 37a and the aft framing designated 38a, the latter being provided with a transverse sill element 38b and the forward and rear frames 37a and 38a being connected by the longitudinally extending frame pieces 39a, all detachably connected by hand screws or bolts as in the first described embodiment.

In this latter embodiment the forward end of the package may be provided with a streamlined fairing 50 which may be made of sheet metal and connected to the main framing parts as at 51, 52 and 53.

The aft end of the package in this embodiment is provided with vertical diverging fins 55 attached to the corners of the package and braced by the webs or gussets 56. These fins aid in stabilizing the package against excessive yaw during flight.

In this particular embodiment the framing encloses twenty wire carrying units or cartridges 40, each of which is preferably formed of sheet metal and has an open rear end from which the wire may be drawn, the allotment of wire in each of the cartridges 40 being connected to the wire in the next adjacent cartridge by means which will be described in connection with the explanations of the packing and stowing of the wire.

A glance at FIGURES 4, 6, 7 and 8 without detailed description at this time will reveal the general nature of the laminations of wire convolutions which go to make up the wire units or cartridges 40. It will be quickly realized from these figures that the wires are arranged in a multiplicity of transverse lengths by reverse bends at the ends of these lengths along the sides of the cartridge casing, and that each of the planar sets of convolutions of the wire is separated from the next adjacent ones by thin sheets of material, for example, cardboard or heavy paper. Coupling members are of course provided for the ends of the wires of each unit in order to join them with the similar wire ends of the adjacent unit, and means are also provided for affording friction and pressure exerting devices which will cause the wire convolutions to remain in stowed position until sufficient tension is placed upon the wire to withdraw it from its layer. These arrangements will be best understood from a detailed description of the method of packing the wire. In the illustrated embodiments, the shell of the wire-containing cartridge 40 is constructed of two mating L-shaped sheet metal pieces designated 60 and 61 (see also FIGURE 6). At diagonally opposite edges, flanges formed on the parts 60 and 61 are ultimately held together by fastening elements such as the bolts and nuts shown at 62 in FIGURE 6.

Figure 7:
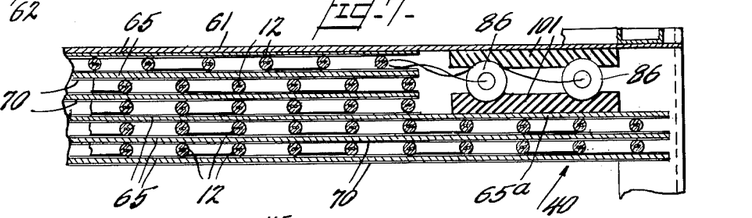
FIGURE 7 is a view in vertical longitudinal section through a portion of one of the cells or wire-containing units, on a still further enlarged scale.
Figure 8:
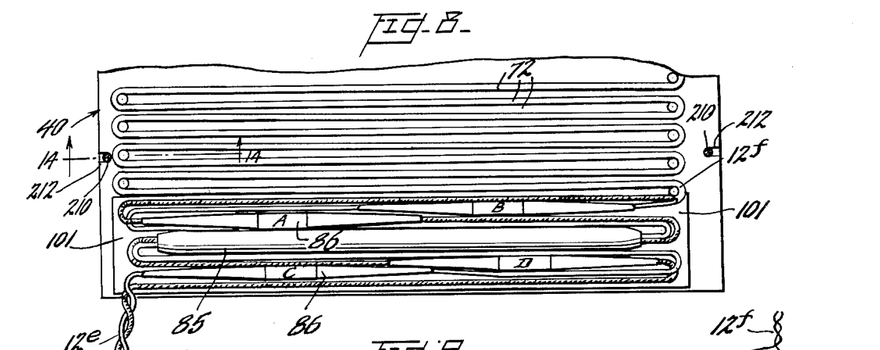
FIGURE 8 is a view in horizontal section of the rear portion of one of the units.
Figure 14:
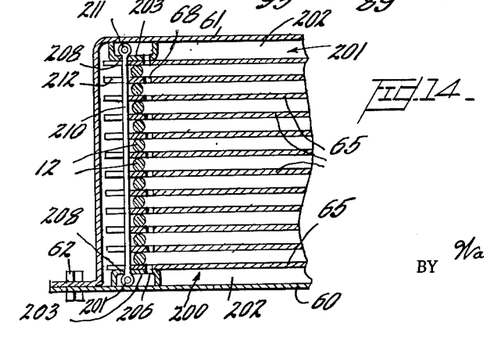
FIGURE 14 is a fragmentary vertical sectional view substantially as taken on the section line 14—14 of FIGURE 8 but showing the wire package as completed.

Referring now more particularly to FIGURES 7, 8 and 14 of the drawings it will be seen that in laying up the units, a rectangular plate, pallet, or frame 200 is disposed upon the bottom sheet of the part 60 of the enclosing shell. This frame is shown partly in section in FIGURE 14 depicting the first embodiment of the invention, but the construction is probably best explained in reference to FIGURE 16 of the drawings in which a further embodiment is illustrated. One has only to imagine the frame 201 of FIGURE 16 to be inverted to realize the exact construction of the bottom frame 200 which is employed in both embodiments. The lower and upper frames 200 and 201 both comprise side channel pieces 202 bridged by transverse bracing channels 203, 204 and 205. It will be noted that these upper and lower frames are omitted from the showings in FIGURES 6 and 15 for the sake of clarity and simplicity of illustration.

Upon the lower frame 200 there is then laid a sheet of cardboard or equivalent material designated 65 and then successive alternating layers of wire convolutions and cardboard sheets 65 are built up until the cartridge unitl is substantially filled. Referring again to FIGURE 15 illustrating the second embodiment of the invention, for illustration of the winding process, it will be seen how the packing takes place. First of all, series of pegs 66 are set up in two rows at respective opposite sides of the unit. The pegs 66 are inserted in the openings 206 in the channels 203 of the bottom supporting frame 200, and the successive sheets of cardboard 65 are provided with openings 68 along each edge portion thereof in registry with the pegs 66. At the stage shown in FIGURE 15 the pegs 66 protrude upwardly from several layers which have already been wound and the winding of the exposed layer has just been completed. The wire 12 as it issues from the next lower sheet as at the point 12a is laid along the margin of the uppermost sheet 65 and then brought around the furthest right-hand pin or peg 66a and then across the width of the sheet where it is wound about the furthermost peg 66b on the left-hand side and thence back across the assemblage to the second peg on the right-hand side around which it is wound for 180° and thence to the next peg on the left, and so on. When the final convolution 12b is accomplished, the next sheet 65 is applied to the layer just formed, whereupon the pegs will protrude through the opening 68 in this sheet and the wire 12 will again be brought up as at 12a and laid along the right-hand margin of the sheet and the next layer begun.

Adhering now more closely to the earlier disclosed embodiment as principally illustrated in FIGURE 14, it will be observed that the upper and lower channels 203 of the respective frames 201 and 200 are provided with additional openings 208 through which an elastic strand element 210 extends. This strand is of a well-known structure of rubber shock absorber cords commonly known as bungie cords. These cords 210 are either knotted at their opposite ends or provided with eyes through which pins or pegs may be inserted, as suggested at 211, and the result of the application of these cords to the finished pile of wire convolutions after the upper compression frame 201 has been installed, is to apply sufficient pressure to the alternate separator sheets and convolutions of wire to frictionally retain the wire.

It may be mentioned that in cases where desired, one or both surfaces of the separator sheets 65 may be made of material having a surface of rough texture, or the surfaces may be preliminarily sprayed with a friction producing material. This roughening or coating is suggested at 70 in FIGURE 7 of the drawings and the proposal may of course be carried out in all of the other embodiments if desired.

In order to accommodate the bungie cords 210 the edges of the separator sheets 65 may be notched as suggested at 212 in FIGURES 8 and 14.

When all of the convolutions have been wound and the upper pressure frame 201 and the bungie cords 210 applied, the pegs 66 are withdrawn and the wires are then merely held by the resilient pressure afforded by the bungie cords and frictional contact with the sheets 65. This is sufficient to maintain them in proper arrangement within the package until the dispensing or laying process has begun, whereupon enough tensile force is applied to the wire or cable to cause the successive layers of convolutions to be withdrawn from between the cardboard separators. This of course allows a very rapid disposing of the wires without any danger of snarling or tangling.

Finally the cover member 61 is applied and the flanges bolted to the lower member 60 as shown. The unit is then ready for insertion into the package assembly as indicated in FIGURE 4 of the drawings.

Figure 4:
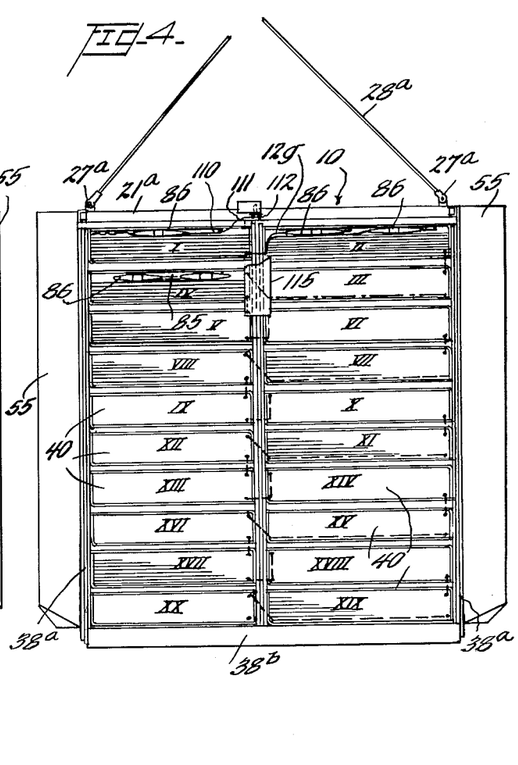
FIGURE 4 is a view in rear elevation of the package shown in FIGURE 3.
Figure 5:
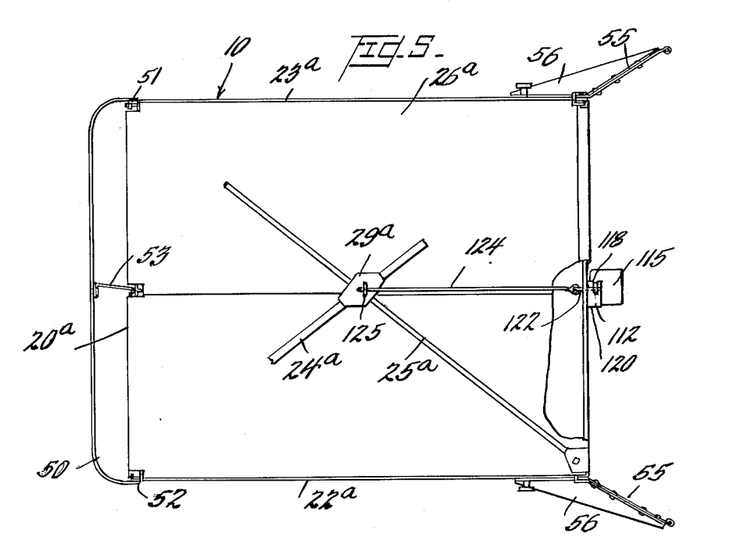
FIGURE 5 is a top plan view of the package of FIGURES 3 and 4.
Figure 5A:
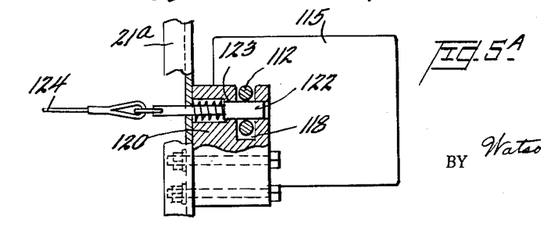
FIGURE 5A is a view partly in plan and partly in horizontal section showing the quick-release means for the weight which propels the cable when it is dropped.

Each of the cartridges or units 40 may well be designed to contain about one-half mile of communications wire and thus when twenty units 40 are assembled in the package 10 as shown in FIGURE 4, provision is made for carrying ten miles of wire in each package. However, each half-mile pack must be suitably coupled both mechanically and electrically for continuous out-feed and it is necessary or desirable to incorporate a small signal amplifier or repeater at intervals of approximately every two miles, that is to say, every fourth cartridge will contain an amplifier as well as the necessary connecting elements.

Figure 9:
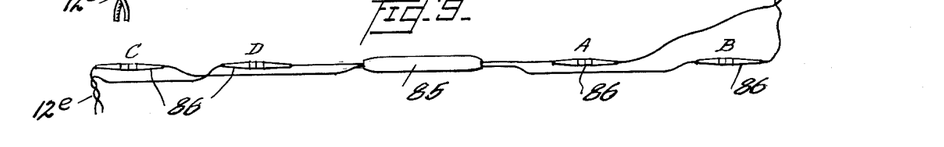
FIGURE 9 is a somewhat diagrammatic view showing the connection and arrangement of the repeaters and couplings between the wire of two adjacent units.
Figure 10:
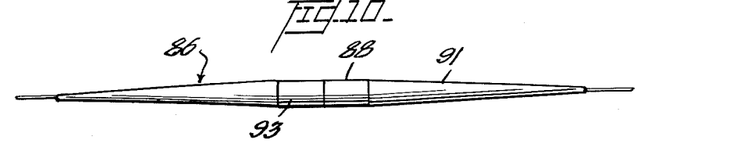
FIGURE 10 is an enlarged view of one of the couplings.
Figure 11:
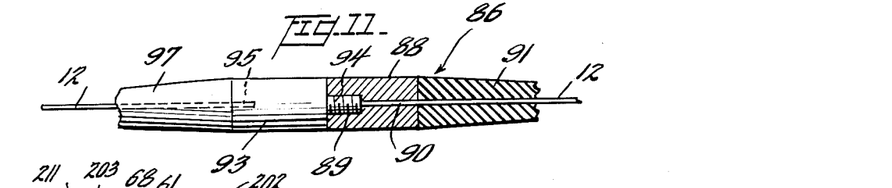
FIGURE 11 is a view partly in section of a typical coupling.

The signal amplifiers may be of any suitable well-known type and are merely suggested diagrammatically by the cylindrical tubular elements 85 (see FIGURES 8 and 9). The coupling devices are also rather diagrammatically indicated by the double tapering elements 86, these elements being illustrated in a number of the figures of drawing, particularly FIGURES 8, 9, 10 and 11. The couplers 86 comprise two mating elements, one of which comprises a metal ferrule 88 having a threaded socket 89, and a central opening into which the end 90 of one length of wire 12 is soldered. A tapering rubber sleeve 91 protects the wire leads from sharp bending and possibly breaking adjacent the ferrule 88. The other member of the coupler 86 is similarly shaped and comprises a ferrule 93 having a threaded central projection 94 adapted to be screwed into the socket 89 of the other half of the coupling and the end of another length of wire 12 is soldered into the ferrule 93 as at 95. A similar tapered rubber protecting sheath 97 is provided for this portion of the device.

In order to better indicate the connecting arrangements between the several units, they have been given numerical designations in FIGURE 4 from I—XX, in the order in which the dispensing of the wire supply proceeds from one unit to the other.

For purposes which will be explained later, unit I is provided with a single connector or coupling 86 for joining the two ends of the double cable comprising the communications wire. This is for the purpose of providing a complete circuit during the laying of the wire so that a signal may be maintained throughout the process in order to determine that the wire is not broken. However in unit II there are provided two couplers 86 for connecting the respective ends of the two strands of the communications cable. Similarly, in unit III there are provided two connectors, but in unit IV it is desirable to incorporate a repeater or signal amplifier and this requires the use of four connectors of the type described and indicated at 86.

Figure 6:
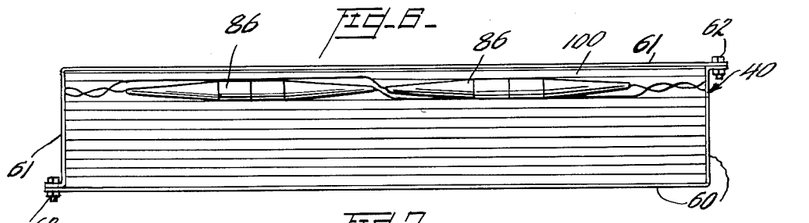
FIGURE 6 is a view in rear elevation of one of the cells or sub-divisions of the wire package, on an enlarged scale.

Now referring more particularly to FIGURES 6 and 7 of the drawings, these figures depict rather diagrammatically the arrangement of units such as II and III where two connectors 86 are employed for connecting the separate strands of the wire cable 12 as they lead off of the topmost layer of convolutions indicated at 100 in FIGURES 6 and 7.

In order to properly house the connectors 86 and insure that they are frictionally held in place before the dispensing tension is applied to the wire, these elements are sandwiched between two relatively thick layers of foam rubber shown at 101 in FIGURE 7. The upper strip of foam rubber may be suitably secured to the top plate 61 of the cartridge, while the lower strip may be secured to the cardboard separator sheet 65d.

Now coming to the arrangement in a unit such as the ones designated IV, VIII, XII, XVI and XX, reference is made to FIGURES 8 and 9 of the drawings. The wire leads coming in from the next lower unit are indicated at 12e, whereas the wires from the uppermost layer of the instant unit are indicated at 12f. Both wires of the cable enter the casing of the repeater or amplifier 85 and for ease of stowage, the connectors 86 are disposed at differing distances from the amplifier 85. The showing in FIGURE 8 illustrates the nesting of the five elements in a pattern to economize space and at the same time provide ready means for dispensing the elements along with the wire supply at the proper time. The several connectors are designated by the letters A, B, C, and D and it will be readily seen that by the arrangement of leads and connectors as shown in stretched-out form in FIGURE 9, the parts may be packed in the snug fashion indicated in FIGURE 8 of the drawings. The elements 85 and 86 are again secured between foam rubber pads 101 as already described.

Now the initiating of the drop of the cable will be described first in reference to the embodiment illustrated in FIGURES 3, 4 and 5. The end loop of the wire adjacent the connector 86 of unit I and indicated at 110 in FIGURE 4, is connected by means of a strand 111 with an eye 112 as clearly shown in FIGURE 5a of the drawings. Said eye may take the form of an inverted U-shaped element to the lower portion of which may be secured a weight 115 which may be conveniently comprised of a fabric bag full of scrap chain material.

The eye 112 is adapted to enter a slot 118 in a block 120 carried by the upper aft cross-piece 21a near its central point. A release pin 122 is spring urged through a bore 123 in the block 120 to enter the eye 112 and retain the anchor weight constituted by the bag of chain 115 in fixed position until it is desired to begin the wire laying operation. A flexible cable 124 is connected with the pin 122 and passes through a guide eye 125 and thence upwardly to the cockpit of the helicopter where it is accessible to the operator when the laying of the wire is to be initiated. It will be apparent that the retainer pin 122 may be pulled, thus releasing the weight 115 which will snatch the wire from the package beginning with the upper layers of unit I and continuing downwardly through the convolutions of this unit until it is exhausted. The wire lead indicated at 12g from unit I passes to the upper layers of unit II through the connecting elements in that unit, and then the several layers of convolutions of unit II will be snatched as the laying of the wire continues. The leads from the various units to the next succeeding ones are clearly shown by the dotted lines in FIGURE 4.

The wire leading from the last unit XX of the package 10a may be led, as indicated at 15 in FIGURE 1 of the drawings, to the first unit of the package 10 carried by the second helicopter A, whenever it is desired to lay more than the capacity of one package.

It will be noted that there is but one connector element 86 in package I and this element serves to electrically connect the two ends of the duplex cable to each other. Thus, during the laying of the cable a complete circuit may be maintained so that a signal can be sent through the cable during the operation to check continuity in the cable.

Reverting now to the embodiment 10a of the package as illustrated in FIGURE 2 of the drawings, it will be seen that the wire from the several units 40 passes through the conical fairing 42 and out through the opening in the fairlead element 45.

Figure 12:
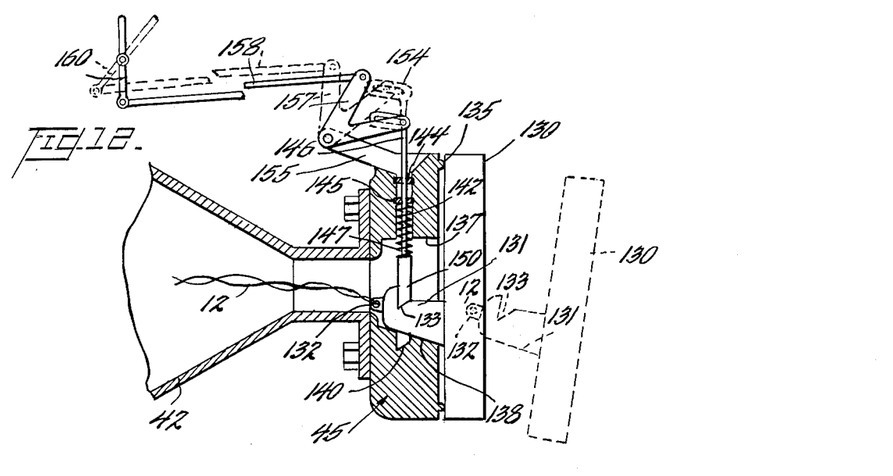
FIGURE 12 is a vertical longitudinal sectional view through a line severing device or guillotine as applied to the package shown in FIGURE 2, the parts being shown in initial line-retaining and line-releasing positions.
Figure 13:
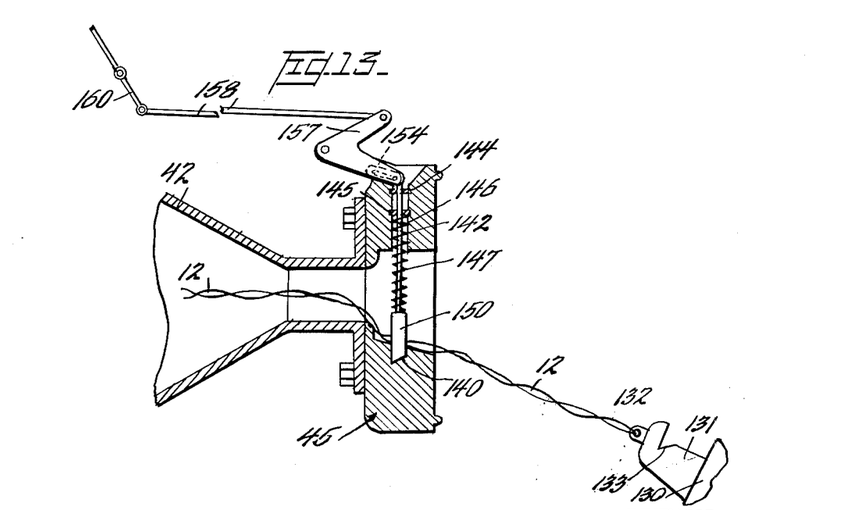
FIGURE 13 is a similar view showing the parts in line-severing positions.

The details of this element, which also embodies wire severing means, is clearly shown in FIGURES 12 and 13 of the drawings. In this example, the wire 12 is connected to the anchor or weight element which, in this case, may comprise a rather heavy closure plate 130 having a hook-shaped rearward protrusion 131 carrying an eye 132 for the fastening of the wire 12 and also provided with a retaining notch 133. When secured in place before the operation commences, the weight plate 130 fits snugly against the outer face of the fairlead element 45 and may be sealed off by the packing element indicated at 135.

An opening 137 through the fairlead casting 45 has a sloping lower surface 138 which is interrupted by a notch 140 which, when the plate 130 is in position, directly underlies the notch 133 in the projection 131 of the plate. An opening 142 extends downwardly through the upper portion of the block 45 and this opening is fitted with guide pieces 144 and 145 through which extends the plunger shaft 146 to the lower end of which is fixed the knife blade 150. Between the blade 150 and the lower guide piece 145 is compressed a coil spring 147, which urges the blade downwardly toward shearing position. The upper end of the plunger 146 is provided with a slotted offset head portion 154, and mounted upon a bracket 155 extending from the block 45 is a bell crank member 157, one arm of which has a pin and slot connection with the head 154 of the plunger 146 and the other arm of which is connected by means of the link 158 to the lower end of a manually actuatable lever 160 within reach of the operator of the helicopter.

When the parts are in the relative position shown in solid lines in FIGURE 12 of the drawings, the anchor block 130 is held in position by the engagement of the blade 150 within the notch 133 of the projection 131. Then when the wire laying procedure is to begin, the lever 160 is manipulated to cause the plunger 146 and the blade 150 to be elevated against the urging of the spring 147 sufficiently for the blade 150 to clear the notch 133, whereupon the weighted anchor 130 will fall drawing with it the wire 12 which will be successively fed from unit to unit of the package.

If during the process, conditions are encountered where it is imperative or advisable to sever the wire 12, the lever 160 is thrust in the opposite direction as shown in FIGURE 13 of the drawings, whereupon the blade 150 aided by the spring 147 descends into the anvil slot 140 of the block 45, thus shearing the wire 12 and terminating the out-feed of the wire supply.

A slightly different form of actuator is suggested in FIGURE 2 of the drawings where the bell crank 157a is actuated by means of a Bowden wire cable device, indicated diagrammatically at 170, which leads to the cockpit of the helicopter where suitable actuators cause the Bowden wire to operate the device in a manner similar to the lever and linkage arrangement shown in FIGURES 12 and 13.

Under certain emergency circumstances, it may be necessary to jettison the whole package and provision is made for effectuating this purpose, the details being shown to best advantage in FIGURE 2A of the drawings. The exemplary embodiment of the jettisoning connection comprises the block 35 which is suspended from the cable lengths 32 and which in turn serves to support the ring 30 from which the cable length 28 diverge to the framing of the package 10a.

The block 35 is cleft as at 175 and a cranked arm or hasp 176 is pivoted between ears 177 upon the underside of the block 35 as by means of the pintle 178. The hasp 176 is arranged to swing upwardly into the recess 175 and to be retained therein by the removable bolt or pin 180, this pin being connected by a cable, chain, or other flexible member to a point manually accessible to the operator of the helicopter.

Within the elbow of the hasp 176 is seated the suspension ring 30, and it will be readily understood that upon pulling the retaining pin 180, the hasp will swing downwardly and release the ring. It will be noted that the arrangement is such that the downward pull on the hasp 176 is resisted mainly by the pintle 178 and only a slight lateral component of pressure is sustained by the draw bolt or pin 180, this permits its ready removal in an emergency.

Figures 15, 16:
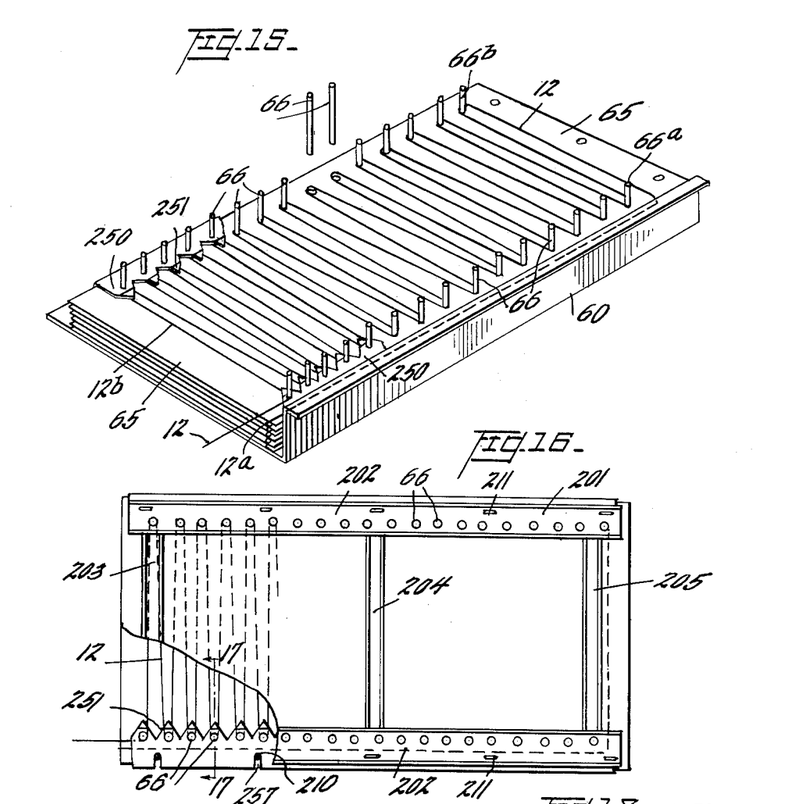
FIGURE 15 is a somewhat diagrammatic view in perspective of a wire package unit comprising another embodiment of the invention as it appears during the process of packing and assembling it.
FIGURE 16 is a top plan view of the package shown partially assembled in FIGURE 15, but with a portion broken away and the cover removed.
Figures 17, 18, 19:
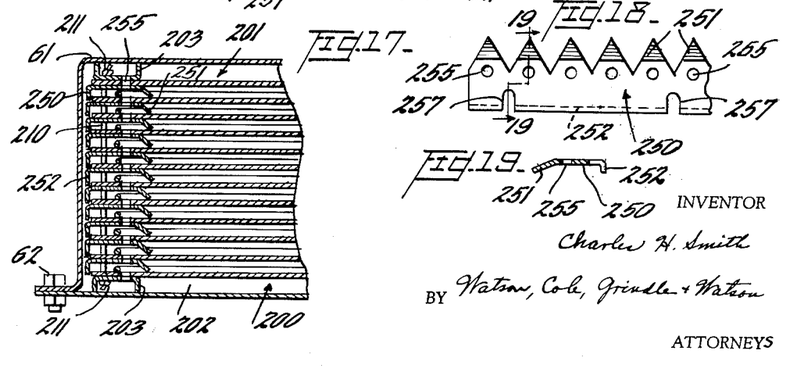
FIGURE 17 is a fragmentary vertical sectional view substantially as taken on line 17—17 but with the wire positioning pegs removed and the cover applied.
FIGURE 18 is a fragmentary view in plan of certain frictional retaining elements employed in this latter embodiment.
FIGURE 19 is a transverse sectional view as taken on line 19—19 of FIGURE 18.

Although FIGURES 15 and 16 have been adverted to for the illustration of certain basic elements common to all of the embodiments, these figures, together with FIGURES 17, 18 and 19, are useful in illustrating another embodiment of the invention in which certain further novel friction applying means are employed. The basic arrangement in this embodiment is the same as already described so far as the shell or casing 60, 61 is concerned and also including the features represented by the frames 200 and 201, the pins or pegs 66, the sheets 65, and the convolutions of the wire 12. The sheets 65 are preferably indented to receive the pegs 66 and the channels 203 are perforated to receive both the winding pegs 66 and the bungie cords 210.

This embodiment of the invention is, however, featured by the provision of flanged strips such as indicated at 250 preferably along both edges of the package between each of the separator sheets 65. As clearly shown in FIGURES 16 and 18 of the drawings the strips 250 are provided with a sawtooth configuration along one edge, each of the teeth 251 being inclined gradually downwardly as shown in FIGURES 17 and 19. The opposite edges of the strips are preferably bent down at substantially a right angle as at 252. Through the base of each of the toothed portions 251 are provided the openings 255 adapted to receive the winding pegs 66. The strips are also notched at 257 to receive the bungie cords 210.

The strips 250 may be made of any suitable material capable of affording a resilient pressure upon the laminations of the package and may well be made of a plastic sold under the trademark Phenolite and meeting the requirements of Federal specification L-L-31 Grade X. Thin gauge aluminum could be used and some other plastic materials affording the desired resiliency. A suggested range of thickness of the material, which of course should not be taken in a strictly limiting sense, since this would depend to some extent upon the flexibility, is from about 0.025 inch to 0.032 inch.

It will be noted from FIGURES 15 and 16 that the points of the sawtoothed projections 251 incline downwardly toward the adjacent separator sheet 65 at places within the loops of the wire 12 which surround the immediate pegs or posts 66. Thus, when the pegs are removed, the points of the friction strips 250 retain the individual loops of wire 12 until the pull of the cable being payed-out snaps these loops or convolutions out from under the teeth 251.

It will be understood from the above specification that there has been provided by the present invention a novel and improved system of laying cable and the like which is particularly adapted for operations across difficult terrain, and which embraces novel methods and subcombinations of apparatus which are peculiarly appropriate to the aerial methods employed.

Various changes and modifications may be made in the embodiments illustrated and described herein without departing from the scope of the invention as defined by the subjoined claims.

Having thus described the invention, what is claimed as new and desired to be secured by Letters Patent is:

1. Apparatus for the rapid and safe laying of communications cable over difficult terrain from an aircraft, which comprises a demountable package containing wire convolutions, means suspending said package from said aircraft at a single point and permitting but a relatively narrow angle of yaw, and means on said package for minimizing yaw and stabilizing the package in flight, the out-feed of the cable from the package being in the aft direction.

2. Apparatus for the rapid and safe laying of communications cable over difficult terrain from an aircraft, which comprises a demountable package containing wire convolutions, means suspending said package from said aircraft at a single point and permitting an angle of yaw of approximately 45°, and vertical fins on the aft portion of said package for minimizing yaw and stabilizing the package in flight, the out-feed of the cable from the package being in the aft direction.

3. Apparatus for the rapid and safe laying of communications cable over difficult terrain from an aircraft, which comprises a demountable package containing wire convolutions, said package being of the configuration of a rectangular parallelepiped, means suspending said package from said aircraft and approximately centrally of the package and at a single point and permitting but a relatively narrow angle of yaw, and vertical fins on the aft portion of said package for minimizing yaw and stabilizing the package in flight, the out-feed of the cable from the package being in the aft direction.

4. Apparatus for the rapid and safe laying of communications cable over difficult terrain from an aircraft, which comprises a demountable package containing multiple units of wire convolutions, readily detachable coupling means for mechanically and electrically connecting the convolutions of each unit with the convolutions of the next adjacent unit, means suspending said package from said aircraft at a single point and permitting but a relatively narrow angle of yaw, and vertical fins on said package for minimizing yaw and stabilizing the package in flight, the out-feed of the cable from the units of the package being in the aft direction.

5. Apparatus for the rapid and safe laying of communications cable over difficult terrain from an aircraft, which comprises a demountable package containing multiple units of wire convolutions, readily detachable coupling means for mechanically and electrically connecting the convolutions of each unit with the convolutions of the next adjacent unit, means suspending said package from said aircraft at a single point and permitting but a relatively narrow angle of yaw, and vertical fins on said package for minimizing yaw and stabilizing the package in flight, the out-feed of the cable from the units of the package being in the aft direction, the communications cable being of double wire, the unit connectors also being double, and a detachable coupling for the lead ends of the wires whereby a test signal circuit may be completed through the cable all during the laying thereof.

6. Apparatus for the rapid and safe laying of communications cable over difficult terrain from an aircraft, which comprises a demountable package containing multiple units of wire convolutions, readily detachable coupling means for mechanically and electrically connecting the convolutions of each unit with the convolutions of the next adjacent unit, means suspending said package from said aircraft at a single point and permitting but a relatively narrow angle of yaw, and vertical fins on said package for minimizing yaw and stabilizing the package in flight, the out-feed of the cable from the units of the package being in the aft direction, the communications cable being of double wire, the unit connectors also being double, and a detachable coupling for the lead ends of the wires whereby a test signal circuit may be completed through the cable all during the laying thereof, and signal amplifiers detachably connected in the circuit at intervals, said amplifiers being enclosed within certain of said successive units depending on the interval selected.

7. Apparatus for the rapid and safe laying of communications cable over difficult terrain from an aircraft, which comprises a demountable package containing wire convolutions, said package being of the configuration of a rectangular parallelepiped, means suspending said package from said aircraft and approximately centrally thereof and at a single point and permitting but a relatively narrow angle of yaw, and vertical fins on the aft portion of said package for minimizing yaw and stabilizing the package in flight, the out-feed of the cable from the package being in the aft direction, and remote controlled means for breaking said single point suspension means in order to jettison the package in an emergency.

8. Apparatus for the rapid and safe laying of communications cable over difficult terrain from an aircraft, which comprises a demountable package containing multiple units of wire convolutions, readily detachable coupling means for mechanically and electrically connecting the convolutions of each unit with the convolutions of the next adjacent unit, means suspending said package from said aircraft at a single point and permitting but a relatively narrow angle of yaw, and vertical fins on said package for minimizing yaw and stabilizing the package in flight, the out-feed of the cable from the units of the package being in the aft direction, the communications cable being of double wire, the unit connectors also being double, and a detachable coupling for the lead ends of the wires whereby a test signal circuit may be completed through the cable all during the laying thereof, and an anchor-weight member connected to the initial out-feed end of the cable adjacent the wire end coupling, and remote control means for releasing said anchor-weight member for initiating the laying of the cable.

9. Apparatus for the rapid and safe laying of communications cable over difficult terrain from an aircraft, which comprises a demountable package containing multiple units of wire convolutions, readily detachable coupling means for mechanically and electrically connecting the convolutions of each unit with the convolutions of the next adjacent unit, means suspending said package from said aircraft, said package comprising a knockdown framework including a braced top frame, frame bars depending from said top frame, and bottom cross bars carried by the lower ends of said depending bars, and a plurality of trays packed within and supported by said framework for containing the wire supply units, and detachable fastening elements securing said framework parts together.

10. Apparatus for the rapid and safe laying of communications cable over difficult terrain, which apparatus comprises a plurality of helicopters, a demountable package of wire convolutions suspended from the underside of each helicopter with a single point of suspension, means carried by each of said packages to minimize yaw during flight, a plurality of units of said wire convolutions in each package, a weight secured to the end of the first wire unit to be laid, couplings connecting the ends of successive units of wire in each of said packages, and a length of wire connecting the last unit of the package carried by the helicopter first to dispense its cable to the first unit of the package of the helicopter next to dispense the cable.

11. Apparatus for the rapid and safe laying of communications cable over difficult terrain, which apparatus comprises a plurality of helicopters, a demountable package of wire convolutions suspended from the underside of each helicopter with a single point of suspension, means carried by each of said packages to minimize yaw during flight, a plurality of units of said wire convolutions in each package, a weight secured to the end of the first wire unit to be laid, couplings connecting the ends of successive units of wire in each of said packages, and a length of wire connecting the last unit of the package carried by the helicopter first to dispense its cable to the first unit of the package of the helicopter next to dispense the cable, means under the control of the pilot of each of said helicopters for jettisoning the package carried thereby in case of emergency, and means detachably connecting the ends of the wire first to be dispensed, whereby a complete signal circuit may be maintained in the entire cable supply of all of the helicopters during the laying operation.

12. Apparatus for the rapid and safe laying of communications cable over difficult terrain, which apparatus comprises a plurality of helicopters, a demountable package of wire convolutions suspended from the underside of each helicopter with a single point of suspension, means carried by each of said packages to minimize yaw during flight, a plurality of units of said wire convolutions in each package, a weight secured to the end of the first wire unit to be laid, couplings connecting the ends of successive units of wire in each of said packages, and a length of wire connecting the last unit of the package carried by the helicopter first to dispense its cable to the first unit of the package of the helicopter next to dispense the cable, and a guillotine device carried by each of said packages and under the control of the pilot of the helicopter by which the package is carried to cut the cable as it issues from the package at any time in case of emergency.

13. Apparatus for the rapid and safe laying of communications cable over difficult terrain, from an aircraft, which apparatus comprises a demountable package containing wire convolutions, means suspending said package from said aircraft at a single point and permitting but a relatively narrow angle of yaw, and means on said package for minimizing yaw and stabilizing the package in flight, the out-feed of the cable from the package being in the aft direction, and guillotine means carried by said package and under the control of the pilot of the aircraft by which the package is carried whereby the cable may be cut as it issues from the package at any time in case of emergency.

14. Apparatus for the rapid and safe laying of communications cable over difficult terrain from an aircraft, which apparatus comprises a demountable package containing wire convolutions, means suspending said package from said aircraft, fairlead means on said package through which said wire passes during out-feed thereof, a guillotine device carried by said fairlead, said device comprising a block having an opening therethrough through which the wire is threaded, a shear slot in one wall of said opening, a knife blade slidably carried by said block and adapted to move across said opening and into said shear slot to sever the wire, and means operable by the pilot of the aircraft to actuate said knife blade.

15. The apparatus as set forth in claim 14 in which there are provided a relatively heavy anchor member for the cable, means connecting the end of the cable to said member, a notched projection extending from said member into said opening with its notch in transverse registry with the notch in the wall of the opening, whereby the knife blade may enter the notch in the anchor member projection and serve to retain the member in preliminary position, as well as to shear the cable, when necessary, by entry into the wall notch after the anchor member has been dropped.

16. The apparatus as set forth in claim 14 in which there are provided a relatively heavy cover plate for the opening in said block which latter also serves as a drop weight and anchor member for the cable, means connecting the end of the cable to said plate, a notched projection extending from said plate into said opening with its notch in transverse registry with the notch in the wall of the opening, whereby the knife blade may enter the notch in the anchor plate projection and serve to retain the plate in preliminary opening-covering position, as well as to shear the cable, when necessary, by entry into the wall notch, after the cover plate has been dropped.

17. Apparatus for the rapid and safe laying of communications cable over difficult terrain from an aircraft, which comprises a demountable package containing wire convolutions, means suspending said package from said aircraft at a single point and permitting but a relatively narrow angle of yaw, and means on said package for minimizing yaw and stabilizing the package in flight, the out-feed of the cable from the package being in the aft direction, the convolutions of wire being arranged in planar layers, a separator sheet interposed between each layer of convolutions, means for resiliently compacting said layers in a direction perpendicular to their planes, whereby the cable may be freely dispensed from the package without tangling, but effectively retained in place in the absence of dispensing pull on the initial out-feed end thereof.

18. The apparatus as set forth in claim 17 in which there are also provided frictional retainer strips along at least one edge of each of said layers, said strips positioned to overlap the loop portions at the ends of the convolutions of wire and having resilient projections entering the loops but yieldable to release them under the dispensing pull on the out-feed end of the cable.

19. The apparatus as set forth in claim 17 in which there are also provided frictional retainer strips along at least one edge of each of said layers, said strips positioned to overlap the loop portions at the ends of the convolutions of wire and having rectilinear spacing flanges along the outer edges of said strips and inclined sawteeth provided along its inner edge, the points of the teeth respectively entering the loops but yieldable to release them under the dispensing pull on the out-feed end of the cable.

20. The apparatus as set forth in claim 19 in which the resilient compression means comprises top and bottom presser pallets embracing said layers and resiliently extensible cords connecting said pallets and serving to urge them together, and in which the friction strips are provided with openings aligned respectively with the teeth for the temporary accommodation of the winding pegs for the wire loops and also with openings for the accommodation of the resilient cords.

21. Apparatus for the rapid and safe laying of communications cable over difficult terrain from an aircraft, which comprises a demountable package containing wire convolutions, means suspending said package from said aircraft at a single point and permitting but a relatively narrow angle of yaw, and means on said package for minimizing yaw and stabilizing the package in flight, the out-feed of the cable from the package being in the aft direction, the convolutions of wire being arranged in planar layers, a separator sheet interposed between each layer of convolutions, means for resiliently compacting said layers in a direction perpendicular to their planes, whereby the cable may be freely dispensed from the package without tangling, but effectively retained in place in the absence of dispensing pull on the initial out-feed end thereof, and an anchor member secured to said end and detachably connected to the package, said anchor member being of sufficient weight to overcome the friction afforded by the resilient compacting means.

22. Cable dispensing means for use in laying communications cable over difficult terrain from an aircraft, said means comprising a package containing a supply of cable, and means for suspending said package from beneath the aircraft for limited lateral swinging movement, means on said package for minimizing said swinging movement to maintain the out-feed of the wire comprising the cable in the aft direction, said package comprising a knock-down framework enclosing at least one tray containing successive laminations of multiple planar convolutions of wire sandwiched between alternate layers of flexible sheets, friction surfaces on said flexible sheets, and means for applying yieldable pressure on said layers in a direction perpendicular to their planes to maintain the convolutions in packed arrangement until dispensing tensile force is applied to the out-feed end.

23. The cable dispensing means set forth in claim 22 in which a multiplicity of trays is disposed in said framework, the adjacent end convolutions of wire of adjacent trays being connected for providing a continuous length of cable to be dispensed from the package, detachable couplings for so connecting the convolutions, said couplings also being sandwiched between certain of said sheets.

24. Cable dispensing means for use in laying communications cable over difficult terrain from an aircraft, said means comprising a package containing a supply of cable, said package comprising at least one unit which includes multiple layers of flexible sheet material, multiple flat planar layers of wire convolutions sandwiched between said layers of sheet material, the surfaces of said layers of sheet material being relatively rough to furnish frictional contact between the sheet material and said convolutions of wires, at least one coupling member at the end of the wire contained in one unit for connecting said end to the end of an adjacent unit, a pocket in the unit for the retention of said coupling member, said pocket being lined with foam rubber.

25. The cable dispensing means as set forth in claim 24 in which signal amplifier members are connected to the wire of certain of the units, said amplifier members also being lodged within one of the foam rubber lined pockets.

26. Apparatus for the rapid and safe laying of communications cable over difficult terrain from an aircraft, which comprises a demountable package containing wire convolutions, means suspending said package from said aircraft, the convolutions of wire being arranged in planar layers, each layer disposed between sheets of thin flexible material, means for resiliently compacting said layers in a direction perpendicular to their planes, whereby the cable may be freely dispensed from the package without tangling, but effectively retained in place in the absence of dispensing pull on the initial out-feed end thereof, said last named means comprising top and bottom presser pallets embracing said layers and resiliently extensible cords connecting said pallets and serving to urge them together.

27. The apparatus as set forth in claim 26 in which the edges of said separator sheets are notched for the accommodation of said cords.

28. The apparatus as set forth in claim 26 in which the edge portions of said separator sheets are provided with openings for the accommodation of said cords, and also provided with openings for the temporary reception of winding pegs used for the formation of the successive loops of the convolutions of the wire.

29. The apparatus as set forth in claim 26 in which the edge portions of said separator sheets are provided with openings for the accommodation of said cords, and also provided with openings for the temporary reception of winding pegs used for the formation of the successive loops on the convolutions of the wire, said package finally comprising an enveloping shell comprising a casing having an aft opening from which the wire is fed.

30. The method of rapidly and safely laying communications cable over difficult terrain, which comprises suspending from each of a plurality of aircraft a package of continuous cable supply, connecting a drop-weight to the initial out-feed end of the first of said packages, connecting the opposite end of the continuous cable in said first package with the initial pay-out end of the cable in a second package carried by the second of the plurality of aircraft, establishing similar connections between the packages carried by successive further aircraft, dispensing the cable from the first aircraft while flying in formation with the others until the first package is emptied, whereupon said first named aircraft may return to base and the dispensing proceed from the second aircraft and so on throughout the formation.

References Cited in the file of this patent

UNITED STATES PATENTS

| | | |
|---|---|---|
| 2,436,402 | Potter | Feb. 24, 1948 |
| 2,456,284 | Jordan | Dec. 14, 1948 |
| 2,490,032 | Cunningham | Dec. 6, 1949 |
| 2,490,837 | Scott | Dec. 13, 1949 |
| 2,913,198 | Bonbrake | Nov. 17, 1959 |

OTHER REFERENCES

"Improved Fire Hose Dispensing Tray for Helicopters," U.S. Dept. of Agriculture, Forest Service, Equipment Development Report No. 44, November 1956.